Jan. 13, 1942.  A. A. CABASSA  2,269,808
REEL
Filed June 4, 1940   3 Sheets-Sheet 1
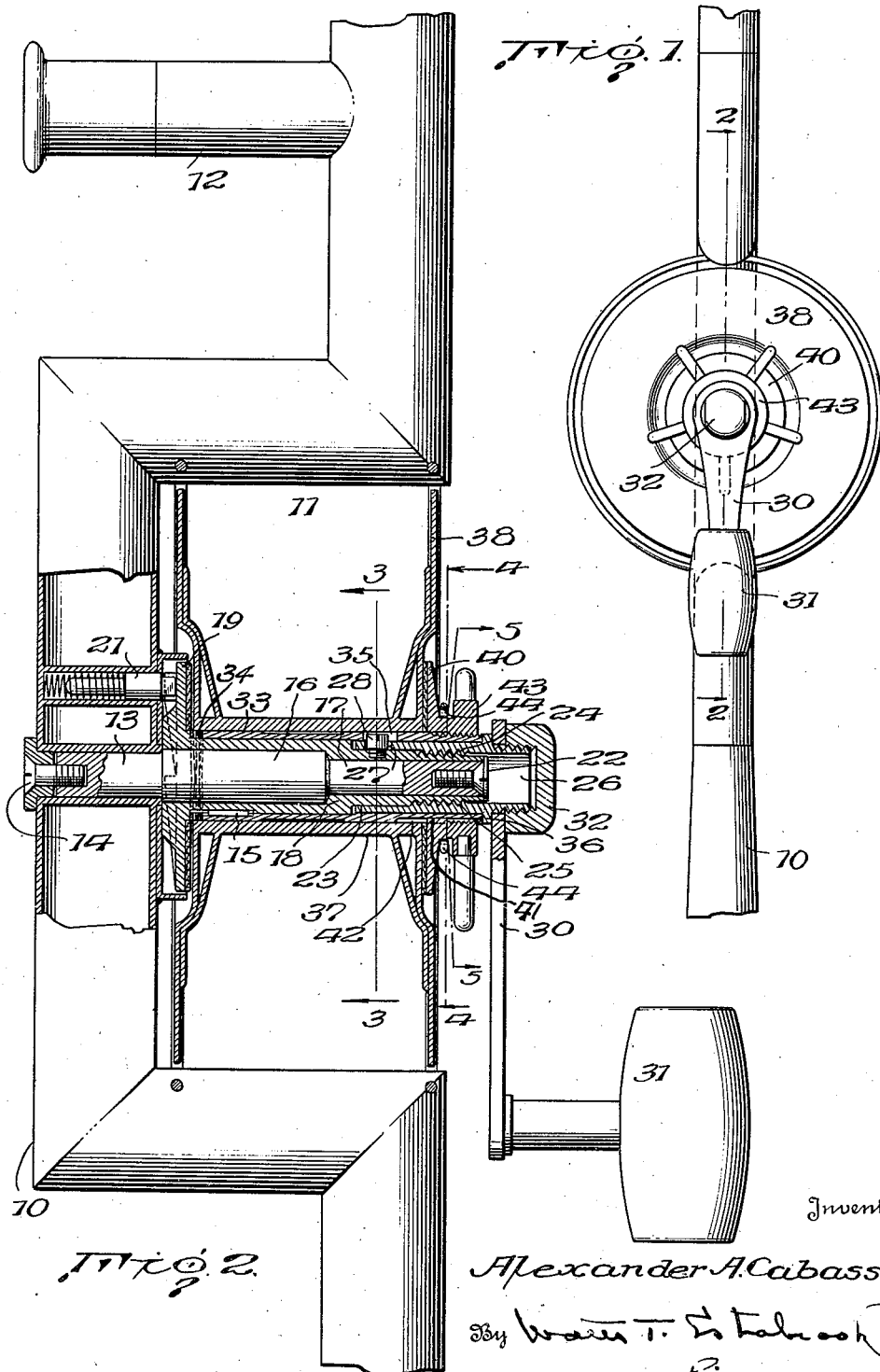
Inventor
Alexander A. Cabassa,
By Walter T. Estabrook
his Attorney Jan. 13, 1942. A. A. CABASSA 2,269,808
REEL
Filed June 4, 1940 3 Sheets-Sheet 2
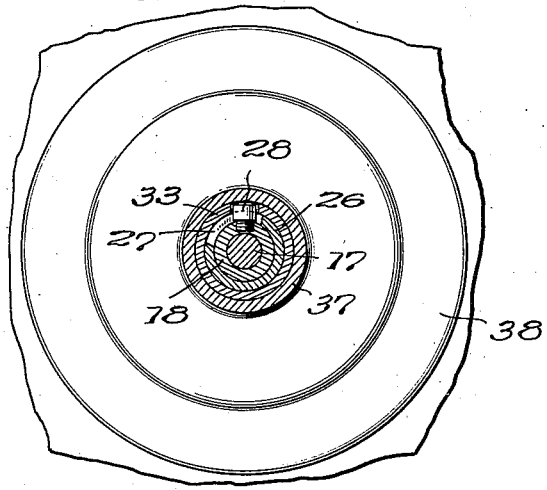
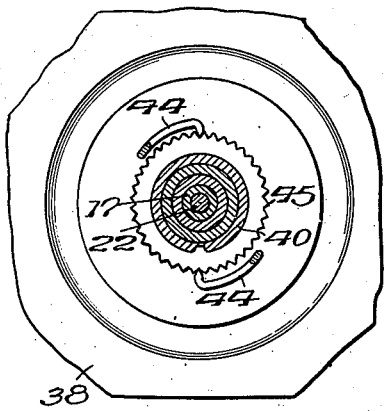
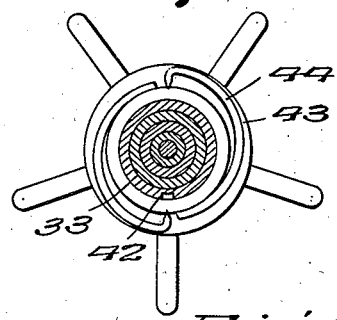
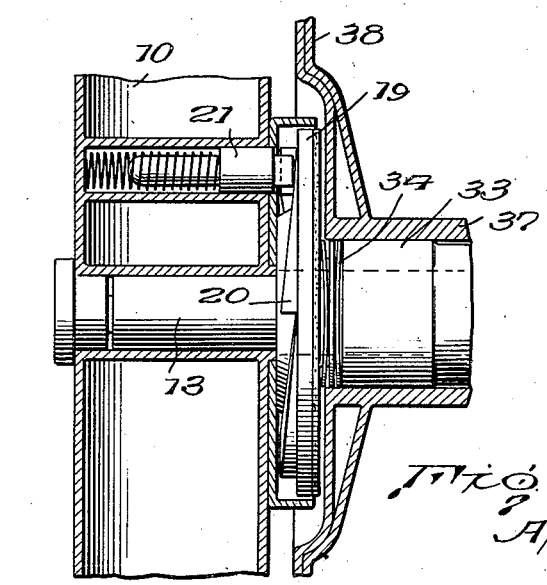
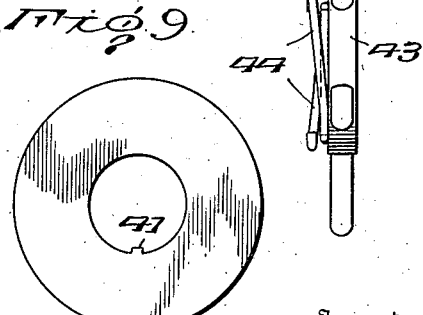
Inventor
Alexander A. Cabassa,
Attorney Jan. 13, 1942. A. A. CABASSA 2,269,808
REEL
Filed June 4, 1940 3 Sheets-Sheet 3
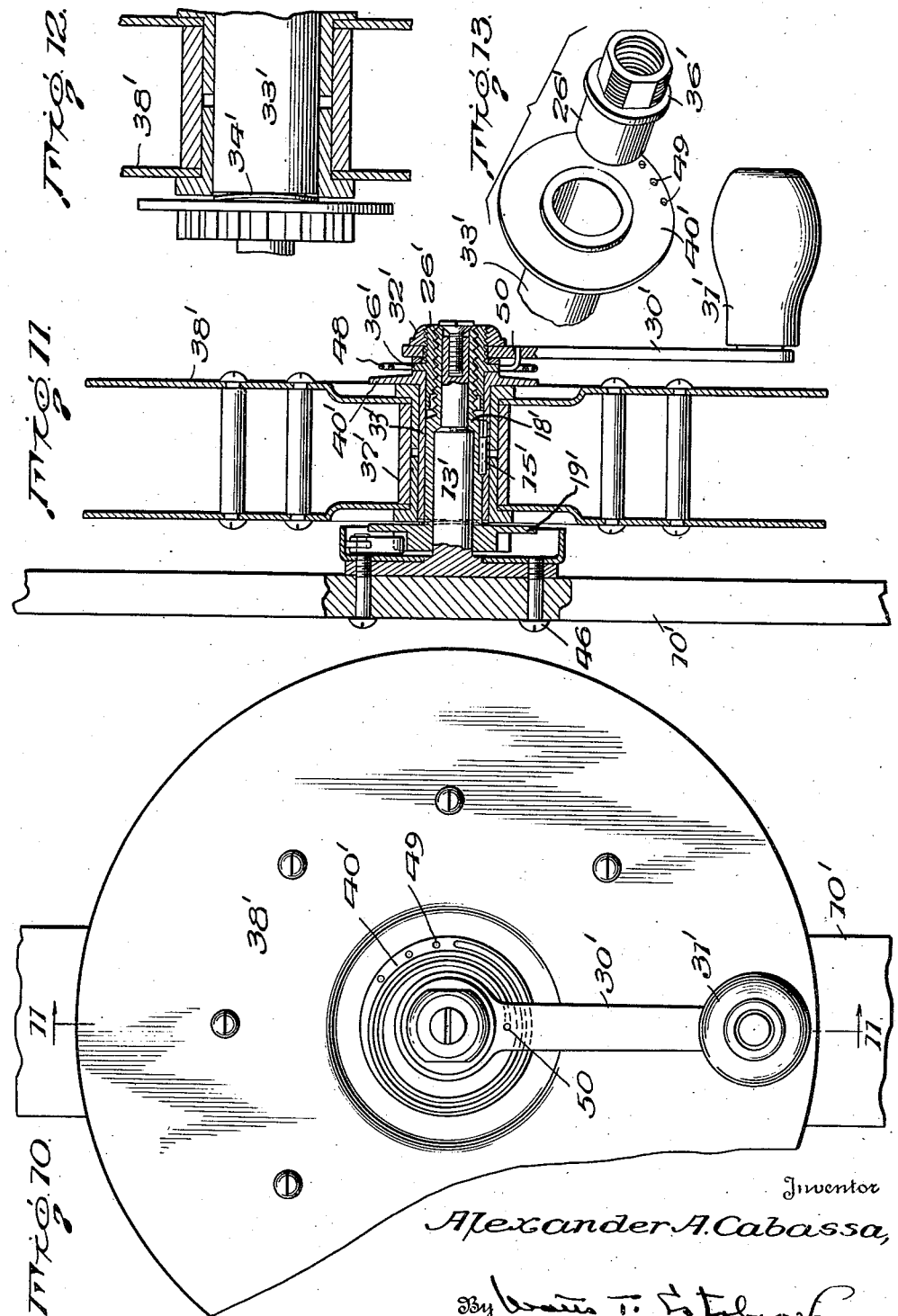
Inventor
Alexander A. Cabassa,
By
Attorney Patented Jan. 13, 1942

2,269,808

UNITED STATES PATENT OFFICE 2,269,808

REEL

Alexander A. Cabassa, Lakeland, Fla.

Application June 4, 1940, Serial No. 338,798

9 Claims. (Cl. 242—84.5)

This invention relates to an improvement in reels and more particularly of the fishing reel type although it is adaptable for other purposes such as for use as an aerial control reel for airplanes.

The invention consists in providing a reel or spool which may be made free running upon giving the winding handle a short turn in a counter-clockwise direction. A further feature of the invention is in the provision of means for causing the spool to be rotated in a clockwise direction by the handle and prevented from movement in a counter-clockwise direction.

Another purpose of the invention is in the provision of means for controlling the rotation of the spool in either direction of rotation by a manipulation of the handle.

The invention consists of certain novel features of construction and combinations of parts which will be hereinafter described and pointed out in the claims.

In the accompanying drawings:

Figure 1 is a view in side elevation of the invention applied to the handle portion of a fishing rod;

Figure 2 is a view partly in elevation and in section, taken on line 2—2 of Figure 1;

Figure 3 is a transverse vertical sectional view on line 3—3 of Figure 2;

Figure 4 is a transverse vertical sectional view on line 4—4 of Figure 2;

Figure 5 is a transverse vertical sectional view on line 5—5 of Figure 2;

Figure 6 is a view in elevation of the wing nut or brake;

Figure 7 is a perspective view of the telescopic sleeves;

Figure 8 is an enlarged detail view in vertical section illustrating the mounting of the spool on the rod and the mechanism for controlling counter-clockwise movement of the spool;

Figure 9 is a view in elevation of the brake disk;

Figure 10 is a view in side elevation of a modified form of the invention;

Figure 11 is a vertical sectional view on line 11—11 of Figure 10;

Figure 12 is a detail view partly in elevation and in section of the ratchet, spool and movable sleeve; and Figure 13 is a perspective view of the drive sleeve and movable sleeve disassembled.

In the construction shown in Figures 1 to 9 a support or fishing rod handle 10 is provided with a recessed portion 11 for the reception of a reel and a hand hold 12.

Mounted on the handle 10 is a spindle or axle 13, which is held in a socket formed in the handle by a screw 14. The axle 13 is provided with an enlarged portion 16 and a reduced outer portion 17. The portion 16 is adapted to engage with a wall of the recessed portion 11 for stationarily supporting the axle on said recessed portion.

A sleeve 18 is journaled on the axle 13 and is provided with a stepped bore to conform to the portions 16 and 17, of the axle 13 and limit the longitudinal movement of the sleeve on the axle. A friction shoe or flange 19 is formed on one end of the sleeve 18 and is provided on its outer face with a row of ratchet teeth 20 adapted to be engaged by a spring actuated pawl 21 carried by the handle 10 for preventing counter-clockwise rotation of the sleeve 18 and shoe 19. The sleeve 18 is held against longitudinal movement on the axle 13 by means of a screw 22 which is threaded into the end of the axle 13.

The sleeve 18 has a reduced outer portion 23 on which is formed screw threads 24 of a pitch to afford a "quick or fast feed." Mounted on the sleeve 18 and provided with internal threads 25 of a similar character as the threads 24 is a drive sleeve 26. Sleeve 26 is provided with a slot 27 which cooperates with a stop or pin 28 carried by the sleeve 18 for limiting the rotary movement of the sleeve 26 with respect to the sleeve 18, and as indicated in Figure 7, allows for a movement of approximately 90°, however, it is not the intent to be limited to this precise measurement. The outer end of the drive sleeve 26 is provided with a squared portion 29 for the reception of a crank 30 of the handle 31, and a cap nut 32 is screwed onto the end of the sleeve for fastening the crank and handle thereto.

An outer sleeve 33 is keyed or splined at 15 on the sleeve 18 and between the inner end thereof and the shoe or flange 19 are spring washers 34 which tend to urge the sleeve 33 outwardly. A slot 35 extending longitudinally of the sleeve 33 surrounds the pin 28 and permits of longitudinal movement of the sleeve. An annular flange or shoulder 36 is provided on the drive sleeve 26 with which the outer end of the outer sleeve 33 engages and against which it is projected by the spring 34.

A reel spool, including a hub 37 and two heads or disks 38, 38, is journaled on the outer sleeve 33. The spool is confined or held on the sleeve 33 by a friction shoe or flange 19 on the sleeve 18 engaging the inner head 38, while the other head is engaged by a friction shoe or flange 40 carried by the outer sleeve 33 by a key 41 on the shoe sliding in a groove 42 of the sleeve 33, Figures 4, 5 and 9. The friction shoe 40 is adjustable toward and from the head 38 by means of a wing nut 43 having screw-threaded engagement with the sleeve 33. The nut 43 is provided with two resilient pawls 44, 44 which are adapted to engage with teeth 45 on the shoe 40 for regulating the frictional engagement of the shoes 19 and 40 with the heads 38 of the spool and thereby governing the free rotation of the spool on the sleeve and insuring its rotation with the sleeve.

Upon the rotation of the handle 31 and crank 30 in a clockwise direction the drive sleeve 26 is moved axially of the sleeve 18 and spindle 13 as it is screwed on the sleeve 18 by means of the screw-threads 24, 25, although its rotary movement thereon will be restricted by the length of the slot 27 in its engagement with the pin 28. This engagement of the pin 28 and slot 27 will insure the rotation of the sleeve 18 with the drive sleeve 26. The axial movement of the sleeve 26 will impart a similar movement to the sleeve 33 as the shoulder 36 of the sleeve 26 will cause the sleeve 33 to be moved against the tension of the spring 34, and the pin 28 and slot 35 permitting of this longitudinal movement of the sleeve 33. The several sleeves 18, 26 and 33 are in this manner all joined together and therefore will be capable of rotating as a unit.

This assemblage of the sleeves causes the friction shoes 19 and 40 to be brought into locking engagement with the heads 38 of the spool and thereby insuring the spool to be rotated with the sleeves in winding a line or cable on the spool. Counter-clockwise movement of the sleeve is prevented by the pawl 21 having engagement with the ratchet teeth 20 of the shoe 19. If the spool is to be rotated in a clockwise direction the handle 31 is rotated for rotating the drive sleeve 26 and this movement of the sleeve 26 will cause it to be fed axially of the sleeve 18 by means of the threads 24, 25. This axial movement of the sleeve will cause the shoulder or flange 36 on the sleeve 26 to be urged against the end of sleeve 33 and move it axially toward the brake shoe 19, thereby exerting additional braking pressure on the spool to secure the sleeves and spool together to insure their rotating as a unit. The degree of axial movement of the drive sleeve on the sleeve 18, and the travel of the slot 27 along the pin 28 will be governed by any pull or force tending to cause the spool to rotate in a counter-clockwise direction, such as the pull caused by a fish running with the line which is connected to the spool. The greater the load or pull on the line to rotate the spool counter-clockwise can be resisted by the rotary and axial movement of the drive sleeve 26 on the sleeve 18, and the braking pressure created by such movement will tend to secure the sleeves and spool as a unit and all will be rotated by the handle 31 and drive sleeve 26 in a clockwise direction. Naturally, as the handle 31 and sleeve 26 are rotated counter-clockwise sufficiently to relieve some of the braking pressure by allowing the washers 34 to move the sleeve 33 outwardly the shoe 40 will be retracted, and the spool may rotate counter-clockwise under the influence of any force which is greater than the braking pressure being applied thereto by the shoes 19 and 40.

This construction as shown in Figures 1 to 9 is shown applied to a fishing pole and with deep sea fishing a frictional resistance to the free rotation of the spool is adjusted according to the character of fishing being done and in this instance it is accomplished through the wing nut 43 which is screwed upon the outer sleeve 33 causing the friction shoe 40 and 19 to be drawn against the walls of the disc or heads 38. The spool in this condition can be drawn out by any pull upon the line or cable sufficient to overcome the braking action caused by the friction shoes 19 and 40. To control this movement, the operator would turn the crank by means of the handle 30 which would cause the drive sleeve 26 to be rotated about the inner sleeve 18, causing the sleeve 33 to be moved inwardly toward the brake shoe 19 and carrying the brake shoe 40 therewith thereby causing the spool to be confined more snugly or tightly between the friction shoes. This winding movement in a clockwise direction by the crank 30 will cause the spool to be rotated in a clockwise direction with the sleeves 18 and 33 and the line can thereby be drawn in in accordance with the wishes of the operator. Counter-clockwise motion of the spool is prevented by the pawl 21 which is in constant engagement with the teeth 20 arranged on the outer surface of the friction shoe 19 to the extent of the braking action imposed on the disks 38 of the spool by the shoes 19 and 40, as governed by the position of the nut 43 and the handle 31. The nut 43 is employed for adjusting the shoe 40 on the sleeve 33 so that varying degrees of pressure will be applied by the shoes to the disks 38, and if there is a pull or force applied to the spool greater than the braking action imposed by the shoes through the position of the nut 43 and handle 31, the spool will rotate counter-clockwise due to this greater force. It is to be understood that the nut 43 can be set to obtain the desired degree of braking action, and upon turning the handle 31 clockwise a further degree of braking action will be obtained as the sleeve 33 will be moved toward the shoe 19 and carrying the shoe 40 therewith. Now if it is desired to allow the fish to run with the line, the operator simply causes the crank to be thrown a short distance in a reverse or counter-clockwise direction. This causes an unscrewing of the drive sleeve 26 upon the inner sleeve 18 and as this drive sleeve moves outwardly or axially of the sleeve 18 the spring washers 34 will project the outer sleeve 33 in an outward direction and thereby carry the shoe 40 away from the head 38 and thereby again making the spool free running so that the line may be payed out. From this, it can be seen that the operator can, by the manipulation of the handle 31 and crank 30 permit of the paying out of the line or the checking of the line at any time by simply rotating the handle either in a clockwise or counter-clockwise direction whereby the friction shoes 19 and 40 are either brought into tighter engagement with the spool for causing the line to be reeled in or for causing these friction shoes 19 and 14 to be released from the flanges of the spool sufficiently to allow the spool to be free running.

Now in the construction shown in Figures 10, 11 and 12, the principle of operation is substantially the same, although some of the details of construction are modified. In this construction, the spindle 13' is carried by a support 10' and attached thereto by means of screws 46. Mounted upon the spindle 13' is an inner sleeve 18' on which is mounted the drive sleeve 26' and slidably splined or keyed to the sleeve 18' is an outer sleeve 33' in a manner similar to that shown in Figures 1 and 2. In this instance however, the brake shoe 40' is integrally connected to the outer sleeve instead of being keyed thereto as shown in the other form. A spring washer 34' is interposed between the inner end of the sleeve 33' and the brake shoe 19' for normally urging the sleeve 33 outwardly against the flange 36' of the drive sleeve 26'. The brake shoe 40' is provided with a plurality of holes 49 around its periphery for the reception of an end of a coil spring 48 which surrounds the drive sleeve 26' and the other terminal or end of the spring 48 is received in a hole or opening 50 formed in the handle or crank 31'. The spring 48 is intended to retain the drive sleeve 26' in position on the inner sleeve 18' and prevent the sleeve from being unscrewed from the sleeve 18', and thereby functions somewhat similarly to the slot 27 and pin 28 of the structure set forth in Figures 1 to 9. The spring 48 is of a character that permits it to be wound and placed under tension as the handle 31' and crank 30' are rotated in a clockwise direction, and when so wound causes the brake shoe 40' to be moved into position by the action of the shoulder or flange 36' for engagement with the spool, or in rotating of the spool. When the handle 31' is turned in a counter-clockwise direction, or the handle is released by the operator, the spring 48 will exert a force in rotating the handle in a counter-clockwise direction.

The operation of the spool or reel is similar to the structure of Figs. 1 to 9, however, the spring 48 is capable of adjustment by means of the holes 49 in the shoe 40', and this adjustment or tension of the spring 48 governs the stroke of the handle 31' in feeding the outer sleeve 33' toward the shoe 19' and against the washer 34'. That is, in the assembly of the parts, the drive sleeve 26' would be screwed upon the inner sleeve 18', and then the spring 48 which is attached to the handle 31' would be attached to the drum 40' by inserting an end of the spring in one of the holes 49 in accordance with the pressure the brake shoes are to have against the disks 38' of the spool. In this manner, the spring 48 functions similarly to the nut 43 which upon being screwed onto the sleeve 33 will adjust the brake shoes 19 and 40 as to the braking pressure to be applied to the spool. Therefore, any pull or force exerted on the spool to cause it to rotate counter-clockwise can be checked or stopped by rotating the handle 31' clockwise, and cause the brake shoe 40' to be moved toward the spool and brake shoe 19' by means of the flange 36' for applying additional braking pressure on the spool by the brake shoes.

It will be noted that the spring 48 as employed in this form performs the functions of the slot 27 and pin 28, and nut 43, of the structure set forth in Figures 1 to 9, although the adjustment of the brake shoe 40 by the nut 43 can be made more readily and while the reel is in use and the spool rotating.

It will be seen that with these two constructions the manipulation of the handle can readily control the free running of the spool and the spool can be controlled in its speed of rotation by throwing the handle in a forward direction or the direction of winding wherein the brake shoes will lock the spool more tightly against rotation or cause it to be locked to the sleeves for winding the line thereon.

This form shown in Figures 10, 11 and 12, while adaptable for fishing purposes has also the possibilities of use in many other directions as for instance in paying out an antenna in tuning airplane radios as the operator can allow this spool to become free running by simply throwing the handle in a counter-clockwise direction so that the antenna may be payed out to any length desired and may be immediately checked by throwing the handle in a clockwise direction whereby the brake shoes are brought into closer engagement with the heads of the spool for locking it against rotation.

While certain uses have been specified for these reels, it is not the intent to be limited to such specific uses as it is possible to use the principle herein set forth for other purposes.

I claim:

1. In a reel the combination with a stationary spindle, an inner sleeve rotatably mounted on said spindle and provided with a brake shoe, a drive sleeve mounted on said sleeve for rotary movement thereon, an outer sleeve mounted on said inner sleeve and splined thereto, said outer sleeve capable of a sliding movement on said inner sleeve, a brake shoe carried by said outer sleeve, a spool rotatably mounted on said outer sleeve and disposed between said brake shoes, means for rotating said drive sleeve, means for imparting axial movement to said drive sleeve on rotation thereof, means on said drive sleeve to engage and slide said outer sleeve when said drive sleeve is moved axially in one direction for causing the brake shoe on said outer sleeve to engage the spool for locking it to said sleeves for rotation therewith as a unit, and means for urging said outer sleeve and brake shoe to a position for releasing the spool for free running movement upon axial movement of the drive sleeve in the opposite direction.

2. In a reel, the combination of a fixed spindle, an inner sleeve rotatably mounted thereon and having a brake shoe, a drive sleeve mounted on said inner sleeve and having rotary movement thereon, an outer sleeve splined to said inner sleeve for sliding movement thereon and having engagement with the drive sleeve, a brake shoe on said outer sleeve, a spool journaled on said outer sleeve and disposed between said brake shoes, a crank for rotating said drive sleeve, means associated with said drive sleeve for causing said drive sleeve to be moved axially of said inner sleeve upon rotation of said drive sleeve in one direction to bring the brake shoes into engagement with said spool, said means causing the spool to be released for free running upon a reverse movement of said drive sleeve.

3. In a reel, the combination of a fixed spindle, an inner sleeve rotatably mounted thereon and having a brake shoe, a drive sleeve mounted on said inner sleeve and having rotary and axial movement thereon, an outer sleeve splined to said inner sleeve for sliding movement thereon, a spring for urging said outer sleeve axially of said inner sleeve, a brake shoe on said outer sleeve, a spool journaled on said outer sleeve and disposed between said brake shoes, a flange on said drive sleeve engaging said outer sleeve for moving it axially against the action of said spring, means for rotating said drive sleeve, means for causing axial movement of said drive sleeve upon rotation thereof for sliding said outer sleeve against the action of said spring for bringing the brake shoes into engagement with the spool and locking the spool to the sleeves for rotation therewith, and means for limiting the axial movement of said drive sleeve.

4. In a reel, the combination of a fixed spindle, an inner sleeve mounted thereon and having a brake shoe, a drive sleeve having screw threaded engagement with said inner sleeve for axial movement on said inner sleeve, an outer sleeve splined to said inner sleeve and having sliding movement thereon, a spring for urging said outer sleeve axially of said inner sleeve, a brake shoe on said outer sleeve, a spool journaled on said outer sleeve and disposed between said brake shoes, a flange on said drive sleeve engaging said outer sleeve for moving it axially against the action of said spring, a crank for rotating said drive sleeve and a coil spring connected to said crank and one of the brake shoes.

5. In a reel, the combination of a fixed spindle, an inner sleeve rotatably mounted on said spindle, means for holding said sleeve against rotation in one direction, an outer sleeve mounted on said inner sleeve for axial movement thereon, a brake shoe carried by each of said sleeves, a spool rotatably mounted on said outer sleeve and disposed between said shoes, a drive sleeve mounted for axial movement with respect to the inner sleeve, and having engagement with said outer sleeve for imparting axial movement to said outer sleeve, means for feeding said drive sleeve axially for operating the outer sleeve to cause the brake shoes to engage the spool for connecting the sleeves and spool for rotation as a unit and means establishing a connection between said inner sleeve and drive sleeve for limiting axial movement of said drive sleeve.

6. In a reel, the combination of a fixed spindle, an inner sleeve rotatably mounted on said spindle, an outer sleeve mounted on said inner sleeve for axial movement thereon, a brake shoe carried by each of said sleeves, a spool rotatably mounted on said outer sleeve and disposed between said shoes, means for urging one of said brake shoes out of engagement with said spool, and means for overcoming said means and imparting axial movement to said outer sleeve for causing the brakes to be applied to said spool.

7. In a reel, the combination of a fixed spindle, an inner sleeve rotatably mounted thereon and having a braking shoe, a drive sleeve mounted on said inner sleeve for rotary and axial movement, an outer sleeve slidably mounted on said inner sleeve and provided with a braking shoe, a spool mounted on said outer sleeve and interposed between said braking shoes, means for rotating said drive sleeve, means for feeding said drive sleeve axially of said inner sleeve upon rotation of said drive sleeve, means urging said outer sleeve into engagement with said drive sleeve, said drive sleeve moving said outer sleeve axially as said drive sleeve is moved axially, said axial movement of said outer sleeve causing the braking shoes to engage the spool so that the spool and sleeves may rotate as a unit.

8. In a reel, the combination of a fixed spindle, an inner sleeve rotatably mounted on said spindle, means for holding said sleeve against rotation in one direction, an outer sleeve slidably mounted on said inner sleeve, a brake shoe carried by each sleeve, a spool rotatably mounted on said outer sleeve and disposed between said shoes, a drive sleeve rotatably and axially movable on said inner sleeve, means on said drive sleeve for engaging said outer sleeve to impart axial movement thereto, means for imparting axial and rotary movement to said drive sleeve, said drive sleeve being moved axially in one direction for causing the outer sleeve to slide on said inner sleeve to bring the brake shoes into engagement with the spool so that the sleeves and spool may rotate as a unit, and when said drive sleeve is moved axially in another direction allowing the spool to be released for free running, and means associated with one of said sleeves and drive sleeve for limiting the axial movement of said drive sleeve in either direction.

9. In a reel, the combination of a fixed spindle, an inner sleeve rotatably mounted thereon and having a brake shoe, a drive sleeve mounted on said inner sleeve and having rotary movement thereon, an outer sleeve slidably mounted on said inner sleeve and having engagement with the drive sleeve, a brake shoe on said outer sleeve, a spool journaled on said outer sleeve and disposed between said brake shoes, a crank for rotating said drive sleeve, means associated with said drive sleeve for causing said drive sleeve to be moved axially of said inner sleeve upon rotation of said drive sleeve to bring the brake shoes into engagement with said spool and spring means deformed upon rotation in one direction by said drive sleeve and crank, said drive sleeve being rotated in an opposite direction by said spring means when said crank is released by the operator.

ALEXANDER A. CABASSA.